June 30, 1931.　　　M. W. THOMPSON　　　1,812,573
VEHICLE WHEEL
Filed Aug. 21, 1929
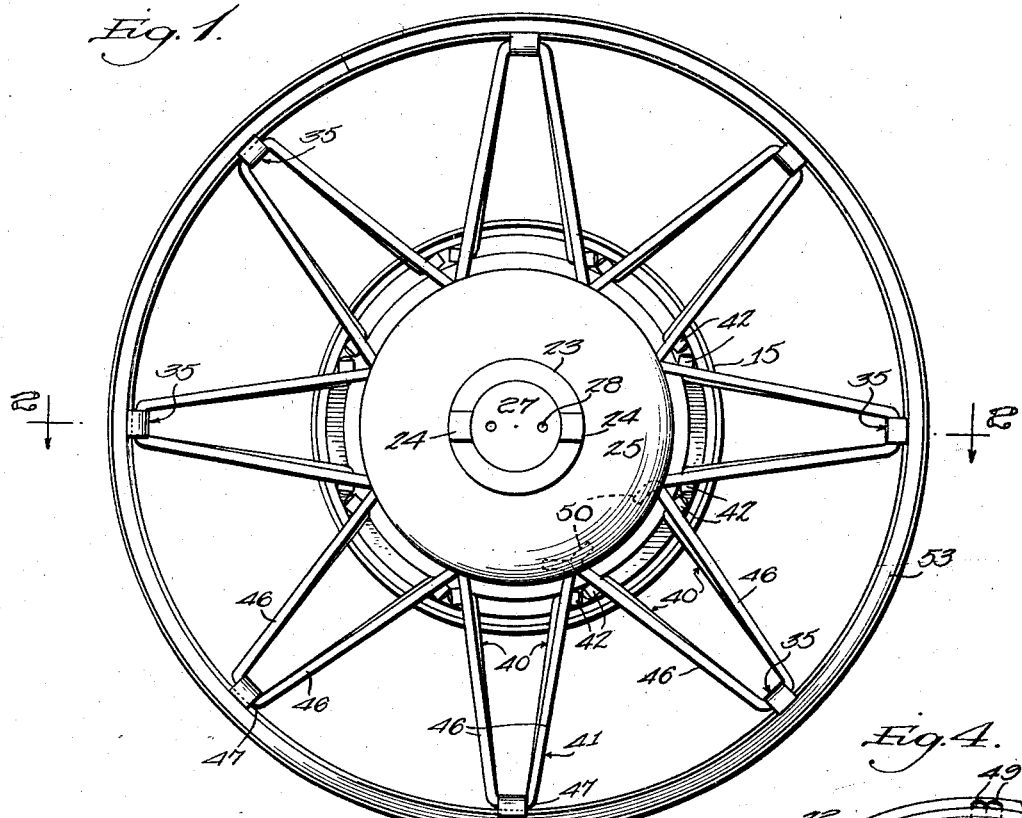
Fig. 1.
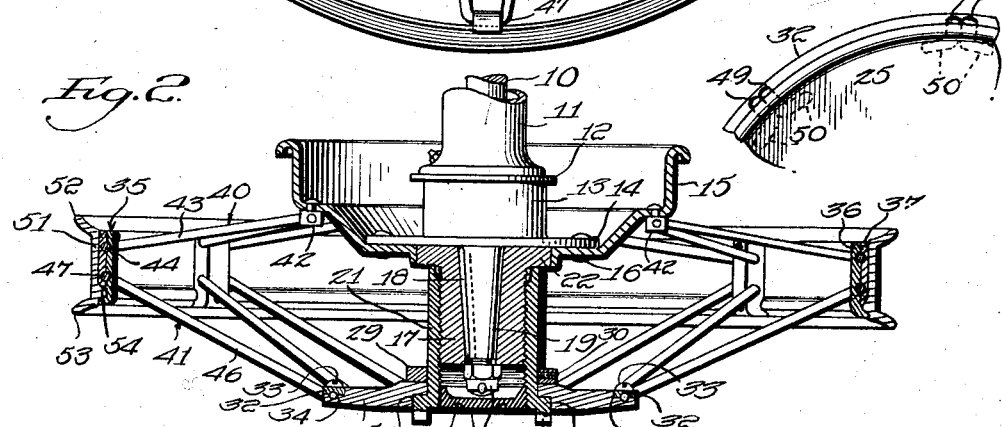
Fig. 2.
Fig. 3.
Fig. 4.
Inventor
Milton W. Thompson
By C. L. Parker Jr.
Attorney Patented June 30, 1931

1,812,573

UNITED STATES PATENT OFFICE

MILTON W. THOMPSON, OF ATLANTA, GEORGIA

VEHICLE WHEEL

Application filed August 21, 1929. Serial No. 387,426.

This invention relates to vehicle wheels, and more particularly to a wire or rod spoke wheel for motor vehicles.

It has been the common practice for several years to employ wire or rod spokes in connection with motor vehicle wheels, but such constructions have been disadvantageous for the reason that it has been necessary to make the entire wheel demountable instead of providing a demountable rim construction and accordingly it has been necessary to provide a vehicle equipped with this type of wheel with an entire spare wheel.

An important object of the present invention is to provide a spoke wheel construction adapted for use in connection with a demountable rim, thereby eliminating the necessity for carrying a spare wheel on the vehicle.

A further object is to provide a vehicle wheel embodying a demountable rim which may be changed with minimum effort and in a minimum length of time.

A further object is to provide a plurality of peripheral elements connected to the outer ends of the spokes of the wheel and to provide means for moving said elements inwardly radially with respect to the wheel to permit the demountable rim to be withdrawn from the wheel.

A further object is to provide a wheel of the character referred to wherein two sets of spokes are employed having their inner ends respectively connected to hub elements which are axially movable with respect to each other to effect inward radial movement of the peripheral elements to permit removal of the demountable rim.

A further object is to provide a wheel construction of such character as to permit the demountable rim to be easily and readily removed without the use of special tools of any kind.

Other objects and advantages of the invention will become apparent during the course of the following description.

In the drawings I have shown one embodiment of the invention. In this showing,

Figure 1 is a side elevation,

Figure 2 is a section on line 2—2 of Figure 1,

Figure 3 is a detail perspective view of one of the peripheral rim engaging elements showing the connection of the spokes thereto, and, Figure 4 is a fragmentary detail perspective view of the outer edge portion of the hub plate.

Referring to Figure 2, the numeral 10 designates one end of a rear axle of a motor vehicle surrounded by the usual housing 11. At its outer end, the housing is flanged as at 12 to receive the inner end of a sleeve 13 which, in turn, is provided at its outer end with a radial flange 14. A brake drum 15 is riveted or otherwise secured as at 16 to the flange 14 to rotate therewith, as will be apparent.

A hub 17 is keyed as at 18 or otherwise secured to the outer tapered end 19 of the axle, and a nut 20 is threaded on the extremity of the axle to hold the hub 17 in proper position. As previously stated, the invention is shown applied to the rear axle of a vehicle in which case the hub 17 is keyed to the spindle 19, but it will be apparent that the invention is equally applicable to the front axles of vehicles, in which case suitable bearings will be provided between the axle spindle and the hub in accordance with standard practice.

As shown in Figure 2, a sleeve 21 is threaded on the hub 17, and has its inner end normally seating against a radial flange 22 preferably formed integral with the hub 17. The outer end of the sleeve 21 is provided with an outstanding radial flange 23, and is also provided with projecting lugs 24 by means of which the sleeve 21 may be rotated in a manner to be described.

A hub plate 25 is mounted to rotate on the sleeve 21. This plate is provided with an annular recess 26 receiving the annular flange 23, and the outer end of the sleeve 21 is preferably flush with the outer end of the plate 25, as shown in Figure 2. The outer end of the sleeve 21 is also preferably provided with a cover plate 27 to retain lubricant in the sleeve, and this plate is preferably arranged flush with the outer surface of the end of the sleeve 21 and is provided with recesses 28 to be engaged by a suitable wrench element to permit the cover plate to be removed.

Movement of the hub plate 25 axially with respect to the sleeve 21 is prevented by means of a collar 29, secured to the sleeve 21 in any suitable manner, such as by means of a set screw 30. The inner face of the peripheral portion of the hub plate 25 is provided with an annular recess 31 receiving a plate 32 secured in position by screws 33. The adjacent radial faces of the recess 31 and plate 32 are provided with recesses 34, for a purpose to be described. As shown in Figures 1 and 2, a plurality of peripheral elements 35 are spaced radially from the inner elements of the wheel and arranged concentric therewith. Each peripheral element constitutes a rim engaging element, as will become apparent and each of the elements comprises inner and outer plates 36 and 37 which are riveted as at 38 or otherwise secured together. Each rim engaging element is provided with a recess 39, for a purpose to be described.

Two series of spokes 40 and 41 are adapted to connect the rim engaging elements 35 to the brake drum and to the hub plate 25, as clearly shown. Referring to Figures 1 and 2, it will be noted that the brake drum is provided with a plurality of lugs 42 secured thereto and adapted to pivotally receive the inner ends of the spokes of the inboard series 40. The spokes 40 may be made singly if desired, but in the present instance they have been illustrated as comprising pairs of diverging spokes 43 connected at their outer ends by shanks 44 mounted in suitable openings 45 formed in the peripheral elements 35.

The outboard series of spokes 41 is preferably constructed similar to the inner series 40, the spokes being arranged in integral pairs 46 connected at their outer ends by shanks 47 mounted in openings 48 formed in the elements 35, and similar to the openings 45 previously described. The inner ends of the spokes 46 preferably extend through openings 49 between the hub plate 25 and the plate 32, and the inner extremities of the spokes are turned toward each other as at 50 for arrangement in the recesses 34. It will be apparent that the ends 50 of each pair of spokes are arranged in alinement with each other, and the corresponding spokes are adapted to partake of slight pivotal movement about the axes of the ends 50.

A rim 51 is adapted to surround the peripheral elements 35, as shown in Figures 1 and 2. The rim 51 is shown as being of the type adapted for use in connection with straight side pneumatic tires, and is provided with one integral flange 52 and a demountable flange 53. The rim is provided with an internal annular flange 54 adapted to be received in the recesses 39 of the rim engaging elements 35.

The operation of the device is as follows:

The elements 35, during the normal operation of the device, snugly engage against the inner face of the rim 51, and axial movement of the rim with respect to the wheel is prevented by the engagement of the flange 54 within the recesses 39. When it is desired to change tires, the sleeve 21 is rotated through the medium of the lugs 24, thus moving the sleeve 21 outwardly to increase the distance between the inner ends of the sets of spokes 40 and 41. This movement is permitted by virtue of the pivotal mountings at the ends of the spokes, and the movement referred to causes the elements 35 to move inwardly radially with respect to the wheel thus causing their disengagement from the rim 51, and permitting the latter to be removed. A spare tire and rim are then placed in position, whereupon the sleeve 21 is turned inwardly to move the inner ends of the spokes 41 toward the inner ends of the spokes 40, this movement obviously causing the elements 35 to be moved outwardly into engagement with the rim 51 with the flange 54 arranged in the recesses 39. The operation described may be accomplished very easily and in a minimum length of time without the use of special tools of any kind.

The inner end of the sleeve 21 normally seats against the hub flange 22, and any suitable implement may be employed for initially rotating the sleeve 21. For example, a jack handle or the like may be arranged between the lugs 24 for loosening the sleeve 21, whereupon the latter may be turned by hand. When the axle is jacked up, the wheel may be spun while the lugs 24 are held stationary in order to cause the sleeve 21 to move outwardly to retract the elements 35, thus facilitating demounting of the rim.

The arrangement of the inner edge of the hub plate 25 between the flange 23 and the plate 29 prevents movement of the hub flange axially with respect to the sleeve 21 as will be apparent. The device as a whole presents a very neat appearance on a vehicle, and from the foregoing description it will be apparent that very little time and effort is necessary to change tires when it becomes necessary to do so. It will be apparent that the device is not limited in any sense to the use of a rim 51 of the character described since any suitable form of rim may be employed. It also will be apparent that the use of wire or rod spokes has been illustrated merely as constituting the preferred embodiment of the invention, and that other forms of spokes may be employed if desired.

The cover plates 27 add to the finished appearance of the wheel and also provide means for retaining lubricant in the bearings of the front wheels of the vehicle.

It is to be understood that the form of the invention herewith shown and described is to be taken as a preferred example of the same and that various changes in the shape, size and arrangement of parts may be resorted to without departing from the spirit of the invention or the scope of the subjoined claim.

I claim:

In a wheel structure comprising axially relatively movable hub elements, an inboard and an outboard spokes series connected to said hub elements, each of said series comprising spoke elements, and a plurality of rim engaging members having pivotal engagement with the outer radial ends of the spoke elements of each series, each spoke element being provided with a substantially circumferentially arranged end portion, each rim engaging member being provided with a pair of axially spaced substantially circumferentially arranged openings in which the end portions of adjacent spoke elements of each series are received.

In testimony whereof I affix my signature.

MILTON W. THOMPSON.